United States Patent
Okeke et al.

(10) Patent No.: US 6,261,499 B1
(45) Date of Patent: Jul. 17, 2001

(54) MOLDED INSEPARABLE ASSEMBLY

(75) Inventors: Eke J. Okeke, Penfield; Robert D. Russell, Pittsford, both of NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 08/398,996

(22) Filed: Mar. 2, 1995

Related U.S. Application Data

(63) Continuation of application No. 08/092,855, filed on Jul. 19, 1993, now abandoned.

(51) Int. Cl.$^7$ .............................. B29C 45/14; B29C 45/32
(52) U.S. Cl. ........................... 264/242; 264/255; 264/264
(58) Field of Search ................................. 264/242, 264, 264/250, 259, 328.17, 261, 263, 255

(56) References Cited

U.S. PATENT DOCUMENTS

| | | | |
|---|---|---|---|
| 3,443,005 | * 5/1969 | Braun | 264/242 |
| 3,891,171 | 6/1975 | Samuelian et al. | 248/131 |
| 3,911,528 | 10/1975 | Rojic, Sr. | 16/128 R |
| 3,978,189 | * 8/1976 | Einhorn | 264/242 |
| 4,021,524 | * 5/1977 | Grimsley | 264/242 |
| 4,046,444 | 9/1977 | Brorein | 339/91 R |
| 4,153,303 | 5/1979 | Tanner | 301/63 PW |
| 4,414,170 | * 11/1983 | Sano | 264/242 |
| 4,578,028 | 3/1986 | Dirksing et al. | 425/525 |
| 4,649,068 | 3/1987 | Collette | 428/35 |
| 5,043,126 | * 8/1991 | Thurau | 264/242 |
| 5,298,215 | * 3/1994 | Krause | 264/242 |

* cited by examiner

Primary Examiner—Angela Ortiz

(57) ABSTRACT

A method for movably connecting two members. The method includes the steps of molding a first member in a first mold portion and placing the first member within a second mold portion. The method also includes inserting molten material into the second mold portion to form a second member. The method further includes limiting contact between the first member and the material to prevent bonding between the first member and to permit relative motion between the members. The method also includes cooling the molten material into a solid form, whereby an assembly is formed from the first and the second member. The method further includes removing the members from the second mold assembly.

16 Claims, 8 Drawing Sheets

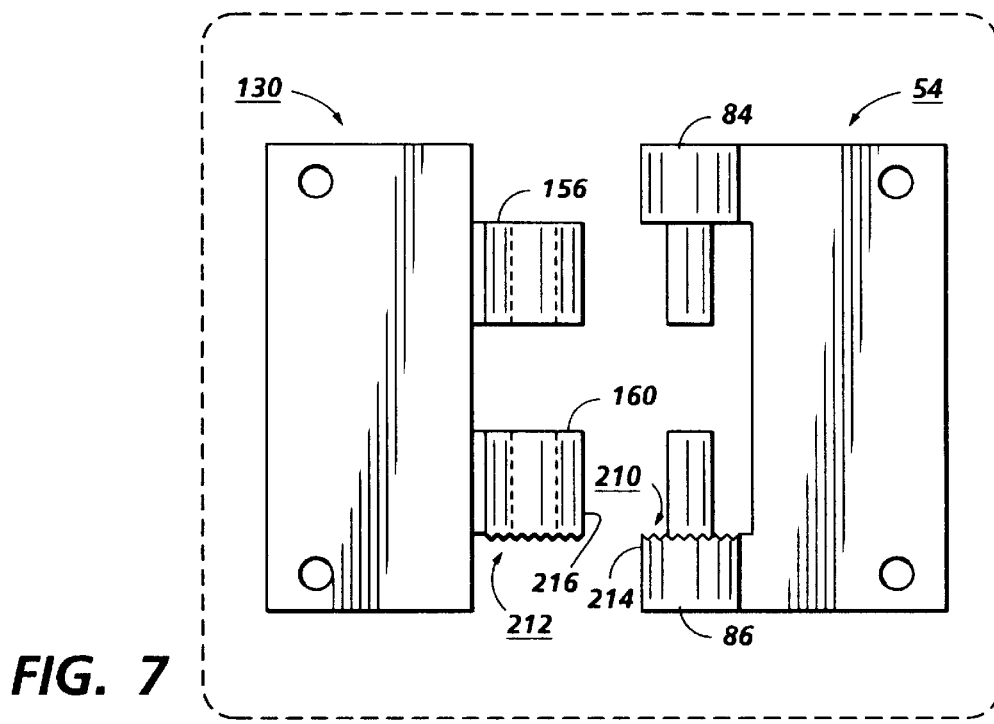
FIG. 7
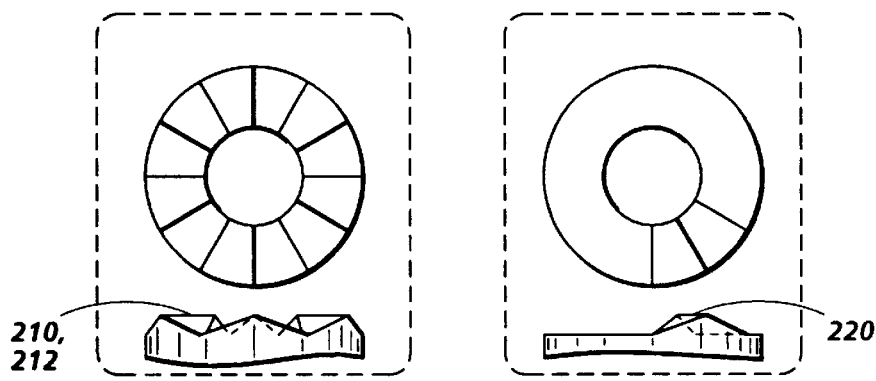
FIG. 8A  FIG. 8B

MOLDED INSEPARABLE ASSEMBLY

This is a continuation, of application Ser. No. 08/092,855, filed Jul. 19, 1993 now abandonded.

present invention relates to a method and apparatus for manufacturing inseparable assemblies. More specifically, the invention relates to molded inseparable assemblies.

Inseparable assemblies are frequently used in the construction of mechanical devices. Particularly in machines with rotating or reciprocating components or assemblies prone to have severe machine vibrations, the use of inseparable assemblies is essential to avoid loosening of fasteners and separation of assemblies. This problem is exacerbated where the assemblies need to have relative motion among their components while maintaining their integrity. Examples of such include hinges and socket joints.

The manufacture of inseparable assemblies is well known. Typically the individual components that comprise the assembly are first manufactured by any suitable currently available method. These components are then combined into an inseparable assembly by any of a number of available methods. For example the components may be welded or peened together. Alternately the components may be adhered by adhesives or shrunk fit by the heat/freeze method. The assembly and securing of these components inherently increases the assembly cost and problems with the integrity of the securing means may be experienced, such as insufficient shrink or peening or defective welds.

The use of molding processes to manufacture components dates back to ancient history. Egyptians poured molten metals into forms which when cooled created items with shapes mirroring the forms. In the process of molding metals, a two piece form or mold is produced with a hollow interior having a shape mimicking the shape of the exterior of the piece to be molded. Molten metal is poured into the mold and the metal fills the hollow interior. The two pieces of the mold are separated from each other and the newly poured piece is removed.

Similar molding processes have existed for some time for manufacturing components from plastic materials. The most common of these processes is injection molding. Typically in this process the mold is housed in a machine which operates like a press and can be either mechanically or hydraulically actuated. As earlier described, the mold with a reverse image of the part is made in two pieces which when aligned together have an interior shape conforming to the shape of the component to be manufactured, and when separated permit removal of the part. Plastic pellets enter a chamber of the press and are compressed by the extending press ram into a liquid form. The liquid plastic material is fed through passageways into the interior of the mold where it solidifies. The press ram then retracts and the two pieces of the mold separate permitting removal of the newly formed plastic part.

The following disclosures may be relevant to various aspects of the present invention:

U.S. Pat. No. 4,649,068,
Patentee: Collette
Issue Date: Mar. 10, 1987
U.S. Pat. No. 4,578,028
Patentee: Dirksing et al
Issue Date: Mar. 25, 1987
U.S. Pat. No. 4,153,303
Patentee: Tanner
Issue Date: May 8, 1979
U.S. Pat. No. 4,046,444
Patentee: Brorein
Issue Date: Sep. 6, 1977
U.S. Pat. No. 3,911,528
Patentee: Rojic, Jr.
Issue Date: Oct. 14, 1975
U.S. Pat. No. 3,891,171
Patentee: Samuelian et al.
Issue Date: Jul. 12, 1977

The relevant portions of the foregoing disclosures may be briefly summarized as follows:

U.S. Pat. No. 4,649,068 discloses an injection molded preform that is intended to be used in a blow molded container. The remainder of the container is molded around the preform which serves to reinforce the neck of the container.

U.S. Pat. No. 4,578,028 discloses a core pin that is used in connection with a blow molded container. The body portion of the container is molded with the core pin. The pin serves to support the neck of the container.

U.S. Pat. No. 4,153,303 discloses a multipart plastic hub assembly. The assembly includes a pair of symmetrically shaped hub members. A rubber tire portion fits around the perimeter of the hub. The pieces snap together with the assistance of detents.

U.S. Pat. No. 4,046,444 discloses a plastic shrouded electrical connector. The connector includes two plastic components that interlock about the metal connector to form an insulated barrier for the connector.

U.S. Pat. No. 3,911,528 discloses a metal hinge that is constructed from two flat components that have mating parallel fingers that are in a position angled to the axis of the hinge. The fingers are coiled together to form an interlocking pivoting hinge.

U.S. Pat. No. 3,891,171 discloses an adjusting cam mechanism for accommodating a variety of mixing bowls for an electric mixer. The mechanism includes interconnected components that have relative motion.

In accordance with one aspect of the present invention, there is provided a method for movably connecting two members. The method comprises the steps of molding a first member in a first mold portion and placing the first member within a second mold portion. The method also includes inserting molten material into the second mold portion to form a second member. The method further includes limiting contact between the first member and the material to prevent bonding between the first member and to permit relative motion between the members. The method also includes cooling the molten material into a solid form, whereby an assembly is formed from the first and the second member. The method further includes removing the members from the second mold assembly.

In accordance with another aspect of the present invention, there is provided a hinge assembly, comprising a first member and a second member integrally molded with the first member to be inseparably interconnected therewith and movable relative thereto.

The invention will be described in detail herein with reference to the following figures in which like reference numerals denote like elements and wherein:

FIG. 7 is an elevational view of the components of an inseparable hinge of the present invention showing teeth located on the masses of the members;

FIG. 8A is a plan view and a partial elevational view of a mass of a component of an inseparable hinge of the present invention showing teeth located on a mass of a member;

FIG. 8B is a a plan view and a partial elevational view of a mass of a component of an inseparable hinge of the present invention showing a tooth located on a mass of a member;

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 6:
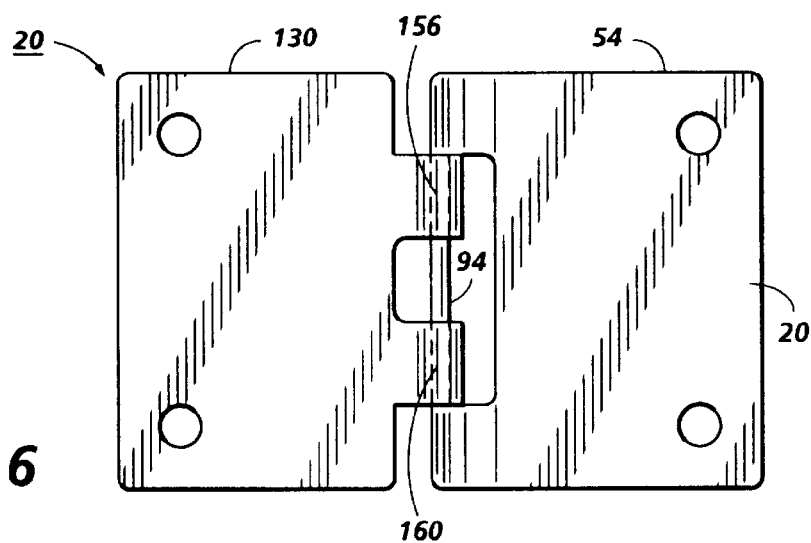
FIG. 6 is an elevational view of the interconnected components of an inseparable hinge of the present invention.
Figure 9:
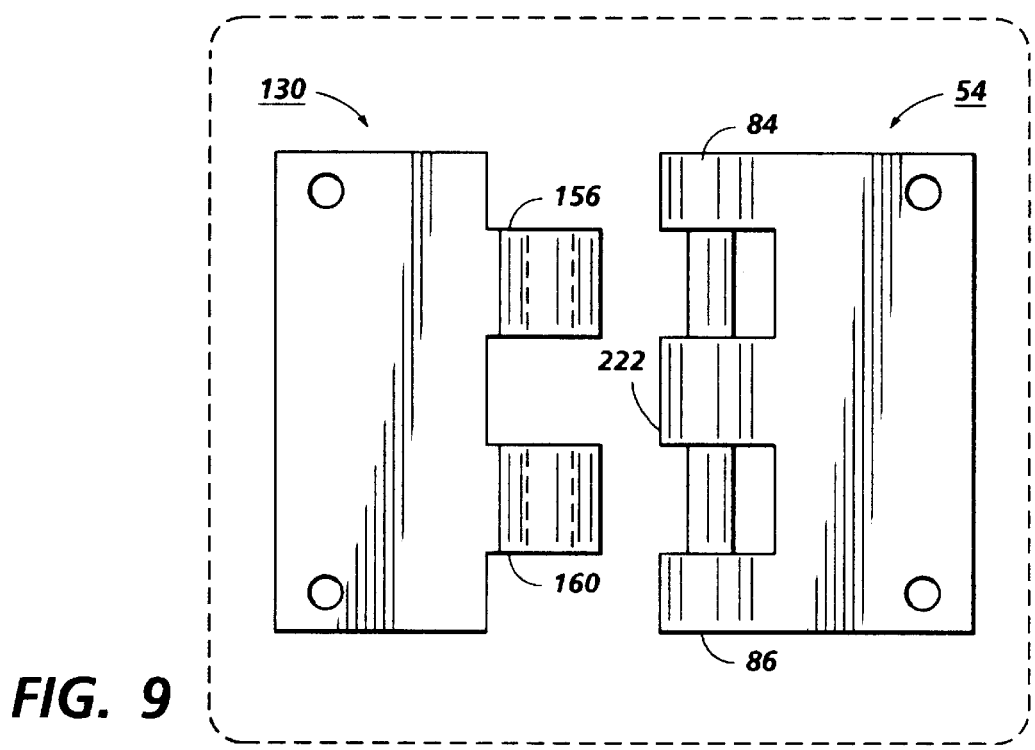
FIG. 9 is an elevational view of the components of an inseparable hinge of the present invention shown separately with the hinge having an additional support rib.

Plastic molded inseparable assembly 20 such as the hinge as shown in FIG. 6 is manufactured by a molding process. Typically, such a molded inseparable assembly 20 is molded in a molding machine which operates like a press and can be either mechanically or hydraulically actuated. The machine (not shown) contains a cavity (not shown) into which a two piece mold is placed.

Figure 2:
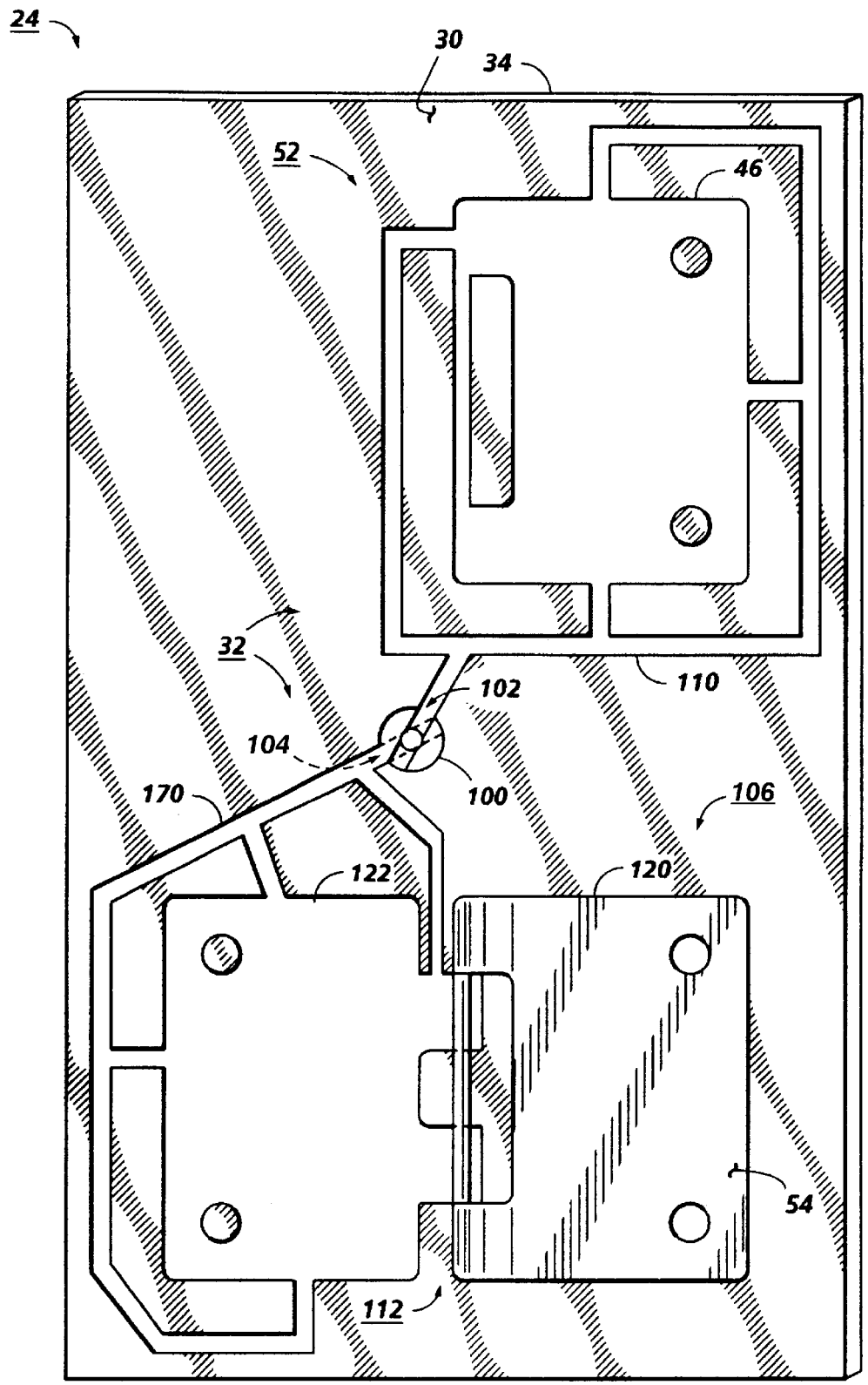
FIG. 2 is a plan view of a lower die half utilized for manufacture of an inseparable hinge of the present invention.
Figure 3:
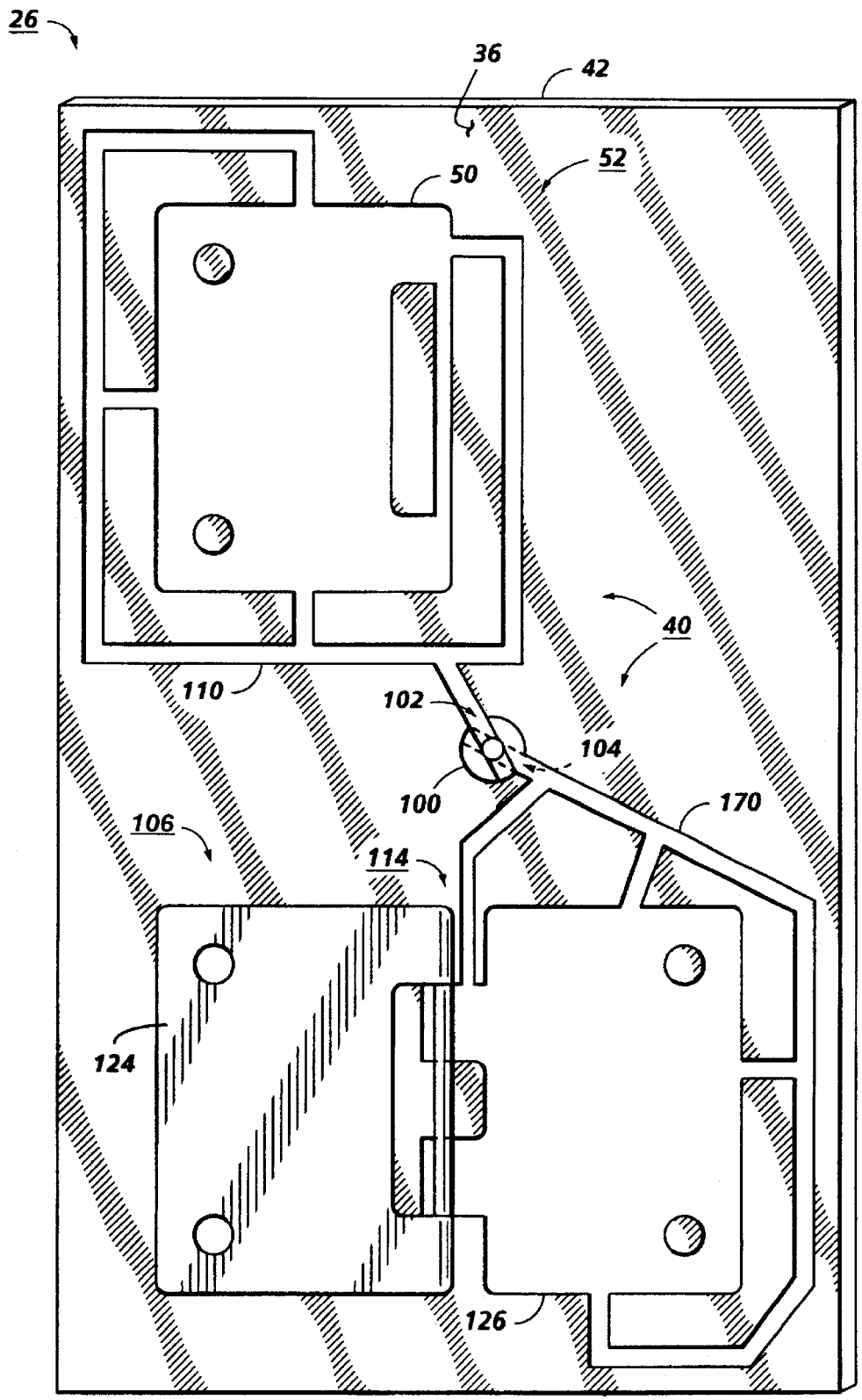
FIG. 3 is a bottom view of an upper die half utilized for manufacture of an inseparable hinge of the present invention.

As shown in FIGS. 2 and 3, the mold typically has a rectangular shape and consists of lower and upper die halves 24 and 26, respectively. The lower die half 24 has an upper surface 30 into which a lower die cavity 32 is machined. The lower die half 24 also has a lower surface 34 that is spaced from and parallel to upper surface 30. The upper die half 26 has a lower surface 36 into which the upper die cavity 40 is machined. The upper die half 26 also has an upper surface 42 that is spaced from and parallel to the lower surface 36. The lower surface 34 of the lower die half 24 matingly fits against the lower surface of the mold cavity (not shown) while the upper surface 42 of the upper die half 26 matingly fits against the upper surface of the mold cavity (not shown).

When the molding machine is in a first position (not shown), i.e., when the upper surface 30 of the lower die half 24 is seated against the lower surface 36 of the upper die half 26, the lower die cavity 32 and the upper die cavity 40 matingly combine a part cavity into which the liquid plastic is received.

As described earlier, the mold has a reverse image of the part and is made in the two pieces, lower die half 24 and upper die half 26, which when aligned together have an interior shape conforming to the shape of the component to be manufactured. When the machine is in a second position, i.e., when the upper die half 26 is separated from the lower die half 24, the molded assembly 20 may be removed from the machine.

Now referring to FIGS. 2 and 3, the die halves 24 and 26 will be more fully described. The mold as shown in FIGS. 2 and 3 suitable for completing the molded inseparable assembly 20. The lower and upper die halves 24 and 26, respectively, include lower and upper cavities 46 and 50, respectively, which combine to form first mold portion 52 in which a first member 54 is formed.

Figure 4:
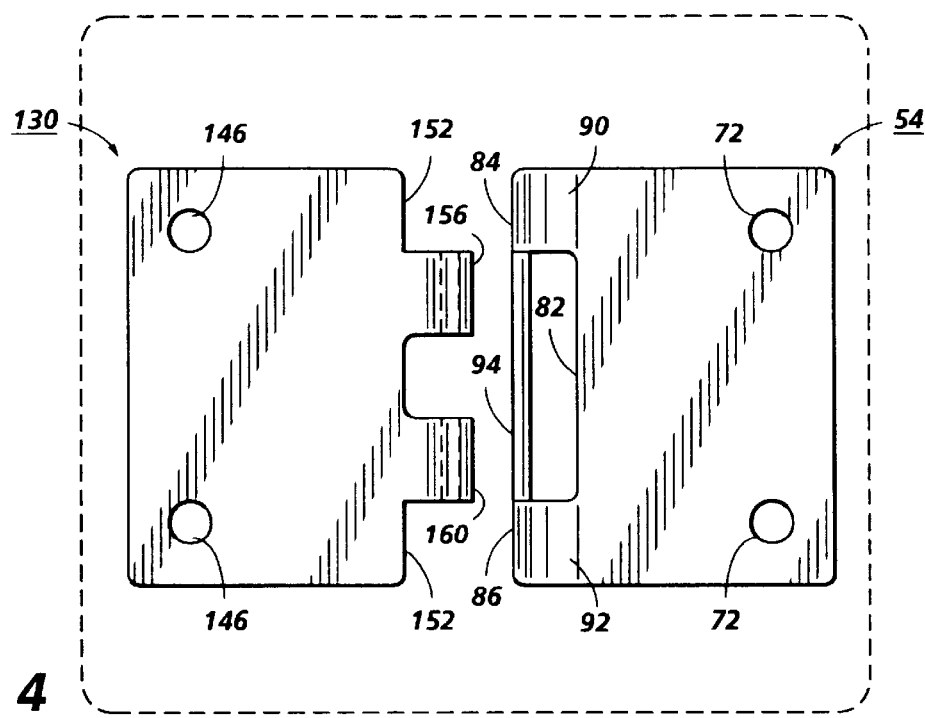
FIG. 4 is a plan view of the components of an inseparable hinge of the present invention shown separately.
Figure 10:
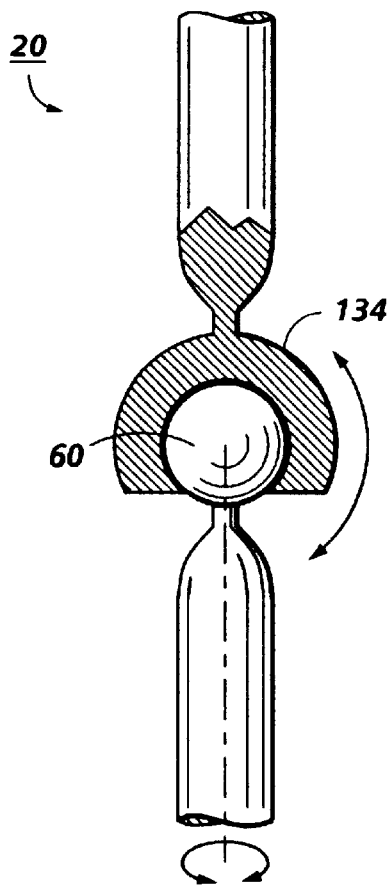
FIG. 10 is an elevational view, partially in section of a ball and socket joint of the present invention.
Figure 12:
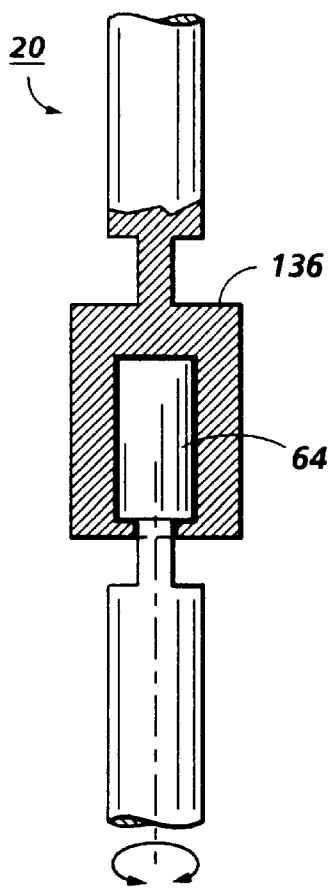
FIG. 12 is an elevational view, partially in section of a pivotal connecting device of the present invention.
Figure 11:
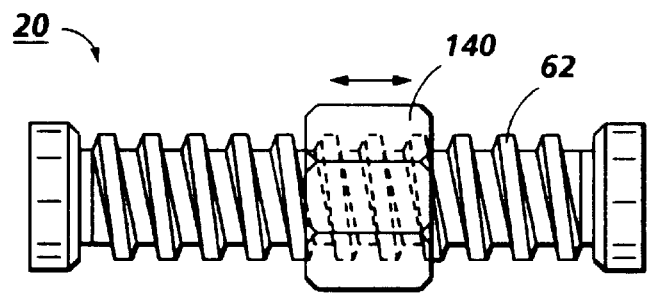
FIG. 11 is an elevational view of a threaded rod and nut of the present invention.
Figure 13:
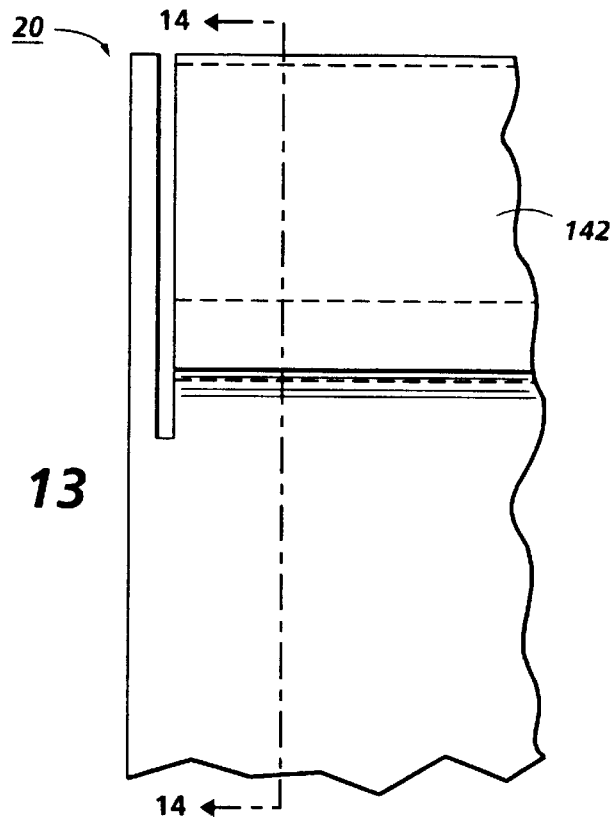
FIG. 13 is an elevational view of a cylindrical lip and groove device of the present invention.
Figure 14:
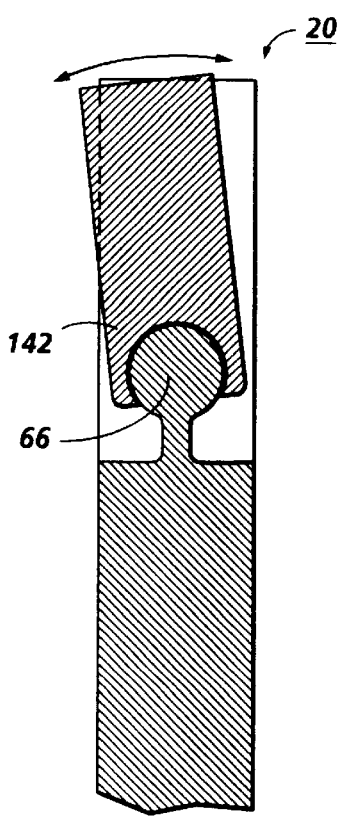
FIG. 14 is a cross sectional view through Section 14—14 of FIG. 13 of a cylindrical lip and groove device of the present invention.

First member 54 may have any suitable shape including, but not limited to, first hinge member 56 as shown in FIG. 4, spherical bulb 60 is shown in FIG. 10, threaded rod 62 is shown in FIG. 11, cylindrical knob at 64 is shown in FIG. 12, and cylindrical lip 66 is shown in FIGS. 13 and 14.

The first hinge member 56 may have any suitable shape and typically has a planar portion 70 which has a generally rectangular shape opening 72 in the form of through holes 74 may be provided in the planar portion 70 for attaching the hinge to appropriate structural members. The planar portion 70 has a mask 80 attached to an edge 82 of the planar portion. The mask 80 typically takes the form of an upper and lower cylinder 84 and 86, respectively, located at upper and lower ends 90 and 92, respectively, of the edge 82. A pintle 94 extends from the mask 80 and typically is located between the lower cylinder 84 and the upper cylinder 86. The pintle 94 typically has a thin cylindrical shape.

In order to mold the first member 54, the upper surface 30 of the lower die half 24 is placed against the lower surface 36 of the upper die half 26 in order that the lower cavity 46 and the upper cavity 50 are aligned to form the first mold portion 52. In the mold as shown in FIGS. 2 and 3, the first member 54 and the molded inseparable assembly 20 are both molded in the same mold. It should be appreciated that the first member 54 and the molded inseparable assembly 20 could be molded from unique and distinct molds. Also, multiple first members 54 and/or multiple inseparable assemblies 20 may be molded from a large multi-piece mold.

When molding a first member 54, while the die halves 24 and 26 are together, liquid pellets are compressed in the machine until a liquid plastic supply is provided. The liquid plastic travels through channels or augers into a switch or valve 100 which has a first position 102 permitting flow to the first mold portion 52 and a second position 104 permitting flow of liquid to the second mold portion 106.

Liquid plastic flows through the switch 100 and into the first mold portion channels 110 which lead into the first mold portion 52. When the liquid plastic completely fills the first mold portion 52, the upper and lower die halves 26 and 24 respectively, are separated and the first member 54, after solidifying, is removed from the first mold portion 52.

Again referring to FIGS. 2 and 3, the lower die cavity 32 also includes a lower second mold portion 112 and the upper die cavity 40 includes an upper cavity 112 for the second mold portion 106. The lower cavity 112 includes a first member portion 120 and a second member portion 122. Likewise, the upper cavity 114 includes a first member portion 124 and a second member portion 126.

After the first member 54 has been molded, the first member 54 is placed in the lower first member portion 120 and the upper die half 26 is lowered against the lower die half 24. The lower cavity 112 and the upper cavity 114 are thus aligned to form the second mold portion 106. The upper and lower cavities 112 and 114 form the shape of the second member 130.

Figure 5:
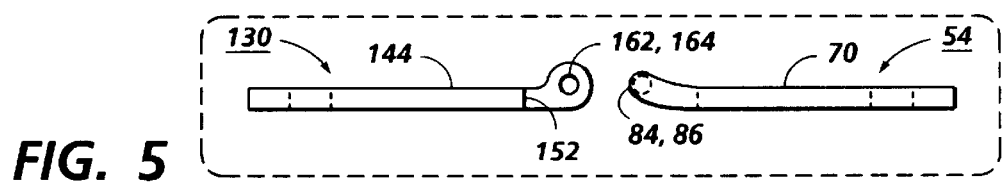
FIG. 5 is a top view of the components of an inseparable hinge of the present invention shown separately.

The second member 130 may have any suitable shape, including but not limited to the second hinge member 132 as shown in FIGS. 4–6, the socket is shown in FIG. 10, the cylinder pocket is shown in FIG. 12, the nut is shown in FIG. 11, and the lip pocket is shown in FIG. 13.

The second hinge member 132 may have any suitable shape, but preferably has a planar portion 144 that is typically rectangular in shape. Preferably, to facilitate mounting of the planar portion 144 onto structural members, the planar portion 144 includes openings 146 such as through holes 150. Extending from an edge 152 of the planar portion 144 is a mass 154 which may have any suitable shape but is preferably a pair of spaced apart upper and lower cylinders 156 and 160, respectively. Openings in the form of upper and lower holes 162 and 164, respectively are preferably centrally located in the cylinders 156 and 160, respectively. The holes 164 and 166 are preferably parallel to the edge 152. The pintle 94 of the first member 54 matingly fits in the openings 164 and 166 of the second hinge member 132.

After the first member 54 has been placed in the second mold portion 106, the upper die half 26 is lowered onto the lower die half 24 in order to form the second mold portion 106. Plastic beads are fed into the screw of the molding machine and are fed to the switch or valve 100 which is placed in the second position 104. The liquid plastic flows through the switch 100 and into second channels 170 and into the second mold portion 106 until the second mold portion 106 is filled with liquid plastic. After the plastic has gelled, the upper die half 26 is raised from the lower die half 24 and the completed molded inseparable assembly 20 is removed.

While any material that may be injection molded may be utilized in this invention, preferably, at least one of the two materials is preferably a material with good lubricity properties such as aldehyde resins or polyamide resins or a combination thereof. Examples of these resins are polyformaldehyde and polyoxymethylene. Enhanced lubricity characteristics of one of the two members reduces the propensity of the second hinge member 132 to adhere to the first member 54 at their points of relative contact, i.e., between the pintle 94 and the holes 164 and 166. The use of the high lubricity material permits the second hinge member 132 to rotate about the openings 164 and 166 about the pintle 94 of the first member 54. In applications where high strength materials are required, and, in particular on hinges, the use of glass filled polyamide resins is preferred.

To prevent the pintle 94 from melting during the molding of the second hinge member 132, preferably, the second hinge member 132 is made of a plastic material with a lower melting point than that plastic material from which the first member 54 was molded. In other words, the second hinge member 132 is molded with a liquid plastic temperature below the melting point of the plastic material from which the first member 54 is molded. Second hinge members made from a material with a melting point 20° F. below that of the first member 54 plastic material has been found to be sufficient. For example, the first member may be made from nylon 66 with a high melt temperature and the second hinge member 132 may be made with a nylon 612 with a lower melt temperature.

Figure 1:
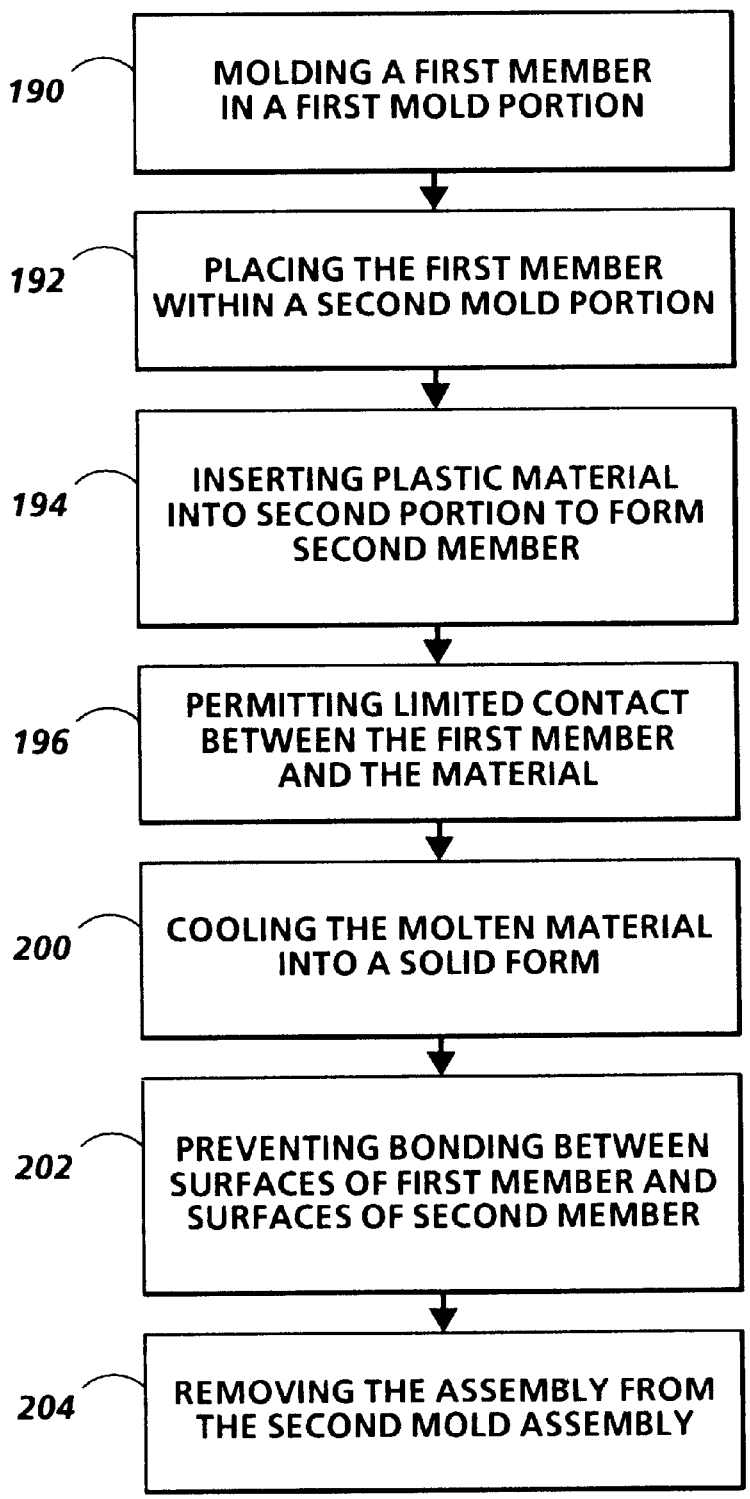
FIG. 1 is a block diagram depicting the method utilized for manufacture of an inseparable hinge of the present invention.

In summary, referring to FIGS. 1, 2, and 3, the first member 54 is made by molding a first member in a first mold portion as illustrated at block 190 of FIG. 1. The first member 54 is then placed within a second mold portion 106 as illustrated at block 192. Plastic material is then inserted into the mold to form a second member 132 by inserting material into a molded form into the second mold portion 106 as illustrated at block 194. Limited contact is permitted between the first member 54 and the second member 132 as illustrated at block 200. Bonding is preventing between the surfaces of the first member 54 in the surface of the second member 132 by limiting the contact between the members, thereby preventing relative motion between the members as illustrated at block 202. Finally, the assembly 20 is removed from the mold as illustrated at block 204.

While the above mentioned manual molding procedure is effective in molding inseparable assemblies, in high volume operations an automated process is preferred to reduce costs. For an automatic process, the use of an injection machine with a double screw barrel is preferably used. The machine should include a rotary cavity feature. Within the machine the first molded portion will be automatically transferred from the first cavity into the second cavity.

In order to provide various fixed relative positions between the first member 54 and the second member 130, first member teeth 210 may cooperate with second member teeth 212 to provide fixed relative positions, as shown in FIG. 7. The teeth 210 and 212 may be located anywhere where the first member 54 contacts the second member 130, but preferably, the first member teeth 210 are located on an upper surface 214 of the lower cylinder 84 of the first member 54. The second member teeth 212 are located on a lower surface 216 of the lower cylinder 160 of the second member 130. The teeth 210 and 212 are preferably equally spaced and mate with each other. While the teeth 210 and 212 may be equally spaced as shown in FIG. 8A, either the teeth 212 or teeth 210 may be replaced by a single tooth 220 as shown in FIG. 8B whereby that single tooth 220 may interact with the teeth 210 or 212 on the other member.

In order to improve the rigidity of the hinge 20, the first member 54 may include a central support rib or cylinder 222 located equally spaced between the upper cylinder 86 and the lower cylinder 84 of the first member 54. Preferably, the support rib 222 has a generally cylindrical shape and will slidably fit between the upper cylinder 156 and the lower cylinder 160 of the second member 132 whereby the strength of the hinge 20 is enhanced.

The molded inseparable assembly 20 may be a hinge as shown in FIGS. 4–9, or represent any other type of structural member where relative motion between a first member 54 and a second member 130 is desirable. For example, referring to FIG. 10, the molded assembly 20 may take the form of a ball and socket assembly wherein the first member 54 represents a spherical ball 60 and the second member represents the socket 134. Referring to FIG. 11, the inseparable assembly 20 may take the form of a rod and nut. The first member 54 may take the form of a threaded rod 62 and the second member 130 may take the form of a nut 140. Also, referring to FIG. 12, the molded assembly 20 may take the form of a cylindrical knob and pocket. The first member 54 may take the form of a cylindrical knob 64 and the second member 130 may take the form of a cylindrical pocket 136. Further, the inseparable assembly 20 may take the form of a lip and groove as shown in FIG. 13. The first member may take the form of a cylindrical lip 66 and the second member 130 may take the form of a groove 142.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A method for movably connecting two members, comprising the steps of:

molding a first member in a first mold portion from a first material;

placing the first member within a second mold portion;

inserting a second material in molten form into the second mold portion to form a second member, at least a portion of the second material being positioned adjacent the first member, the first member remaining in substantially the same shape as when molded in the first mold portion;

selecting at least one of the first material and the second material having enhanced lubricity properties so as to reduce the propensity of the first material and the second material to adhere to each other;

limiting contact between the first member and the molten material to prevent bonding between the first member and the second member while permitting relative motion between the members and maintaining intimate contact between the two members for substantially all of the relative motion therebetween;

cooling the molten material into a solid form, whereby an assembly is formed from said first member and said second member; and removing the assembly from the second mold portion.

2. The method of claim 1, wherein the step of selecting at least one of the first material and the second material includes selecting the first material having lubricity enhancing properties.

3. The method of claim 2, wherein the step of inserting the molten plastic material consisting of inserting a molten plastic material fabricated of materials selected from the group consisting of aldehyde resin and polyamide resin.

4. The method of claim 1, wherein the step of inserting the molten material includes inserting a molten material having a melting point lower than the first member.

5. The method of claim 1, wherein said molding step and said inserting step are performed simultaneously.

6. The method of claim 1, wherein said limiting step comprises permitting pivoting motion between the members.

7. A method for movably connecting two members, comprising the steps of:

molding a first member having a first feature on the first member in a first mold portion from a first material;

placing the first member within a second mold portion having a second feature;

inserting a second material in molten form into the second mold portion to form a second member having a second feature on the second member, at least a portion of the second material being positioned adjacent the first member, the first member remaining in substantially the same shape as when molded in the first mold portion;

selecting at least one of the first material and the second material having enhanced lubricity properties so as to reduce the propensity of the first material and the second material to adhere to each other;

limiting contact between the first member and the molten material to prevent bonding between the first member and the second member while permitting relative motion between the members and maintaining intimate contact between the two members for a substantial portion of the relative motion therebetween;

cooling the molten material into a solid form, whereby an assembly is formed from said first member and said second member; and removing the assembly from the second mold portion, said first feature and said second feature cooperable to permit biasing of the members relative to one another at a relative angular position therebetween.

8. A method for movably connecting two members, comprising the steps of:

molding a first member having a first tooth on the first member in a first mold portion from a first material;

placing the first member within a second mold portion having a second feature;

inserting a second material in molten form into the second mold portion to form a second member having a second tooth on the second member, at least a portion of the second material being positioned adjacent the first member, the first member remaining in substantially the same shape as when molded in the first mold portion;

selecting at least one of the first material and the second material having enhanced lubricity properties so as to reduce the propensity of the first material and the second material to adhere to each other;

limiting contact between the first member and the molten material to prevent bonding between the first member and the second member while permitting relative motion between the members and maintaining intimate contact between the two members for a substantial portion of the relative motion therebetween;

cooling the molten material into a solid form, whereby an assembly is formed from said first member and said second member; and removing the assembly from the second mold portion, said first tooth and said second tooth cooperable to permit biasing of the members relative to one another at a relative angular position therebetween.

9. The method of claim 4, wherein the step of inserting the molten material includes inserting a molten, material having a melting point at least approximately 20 degrees Fahrenheit lower that the first member.

10. The method of claim 1, wherein the step of inserting the molten plastic material comprises inserting a molten plastic material fabricated of aldehyde resin.

11. The method of claim 1, wherein the step of inserting the molten plastic material comprises inserting a molten plastic material fabricated of polyamide resin.

12. The method of claim 1, wherein the step of inserting the molten plastic material comprises inserting a molten plastic material fabricated of glass filled polyamide resin.

13. The method of claim 1, wherein the step of molding a first member comprises molding a molten plastic material fabricated from

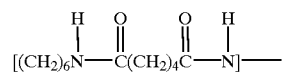

14. The method of claim 1, wherein the step of inserting the molten plastic material comprises inserting a molten plastic material fabricated from

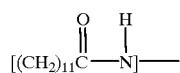

15. The method of claim 1, wherein the step of inserting the molten plastic material comprises inserting a molten plastic material fabricated of polyformaldehyde resin.

16. The method of claim 1, wherein the step of inserting the molten plastic material comprises inserting a molten plastic material fabricated of polyoxymethylene resin.

* * * * *